(12) United States Patent
Ebizuka et al.

(10) Patent No.: US 12,211,194 B2
(45) Date of Patent: Jan. 28, 2025

(54) DEFECT INSPECTION WITH IMAGES OF DIFFERENT SYNTHESIS RATIOS

(71) Applicant: Hitachi High-Tech Corporation, Tokyo (JP)

(72) Inventors: Yasushi Ebizuka, Tokyo (JP); Hiroyuki Shindo, Tokyo (JP); Ryugo Kagetani, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 480 days.

(21) Appl. No.: 17/716,237

(22) Filed: Apr. 8, 2022

(65) Prior Publication Data

US 2022/0335594 A1   Oct. 20, 2022

(30) Foreign Application Priority Data

Apr. 20, 2021   (JP) ................. 2021-071075

(51) Int. Cl.
*G06T 7/00* (2017.01)
(52) U.S. Cl.
CPC .. *G06T 7/0004* (2013.01); *G06T 2207/20081* (2013.01); *G06T 2207/20221* (2013.01); *G06T 2207/30148* (2013.01)
(58) Field of Classification Search
CPC ......... G06T 7/0004; G06T 2207/20081; G06T 2207/20221; G06T 2207/30148; G06T 2207/20224; G06T 7/001; G06T 2207/10061; G06T 7/30; G01N 23/2251; G01N 2223/401; G01N 23/00; G01N 23/203; G01N 2223/053; G01N 2223/079;

(Continued)

(56) References Cited

U.S. PATENT DOCUMENTS

2012/0070100 A1 * 3/2012 Naito ................. H04N 23/6845
                                                                      382/275
2013/0279793 A1   10/2013 Toyoda et al.

FOREIGN PATENT DOCUMENTS

| JP | 2014-77798 A | 5/2014 |
| JP | 6281019 B2 | 2/2018 |
| TW | I475187 B | 3/2015 |

OTHER PUBLICATIONS

Chinese-language Office Action issued in Taiwanese Application No. 111111572 dated Apr. 10, 2023 (five (5) pages).

* cited by examiner

*Primary Examiner* — Hwa Andrew Lee
(74) *Attorney, Agent, or Firm* — Crowell & Moring LLP

(57) ABSTRACT

Provided are a defect inspection apparatus and a defect inspection method that can inspect various types of defects in a synthesized image. The defect inspection apparatus synthesizes a first detection signal from a first detector and a second detection signal from a second detector with a first synthesis ratio to generate a first synthesized image, and synthesizes the first detection signal and the second detection signal with a second synthesis ratio different from the first synthesis ratio to generate a second synthesized image. The defect inspection apparatus generates a first inspection image based on the first synthesized image and generates a second inspection image based on the second synthesized image. The defect inspection apparatus executes a logical operation on the first inspection image and the second inspection image to generate a synthesized inspection image. The defect inspection apparatus executes defect determination on the synthesized inspection image.

10 Claims, 12 Drawing Sheets

(58) Field of Classification Search
CPC ..... G01N 2223/6116; G01N 2223/646; G06N 3/08; H01L 22/12
See application file for complete search history.

[FIG. 1]
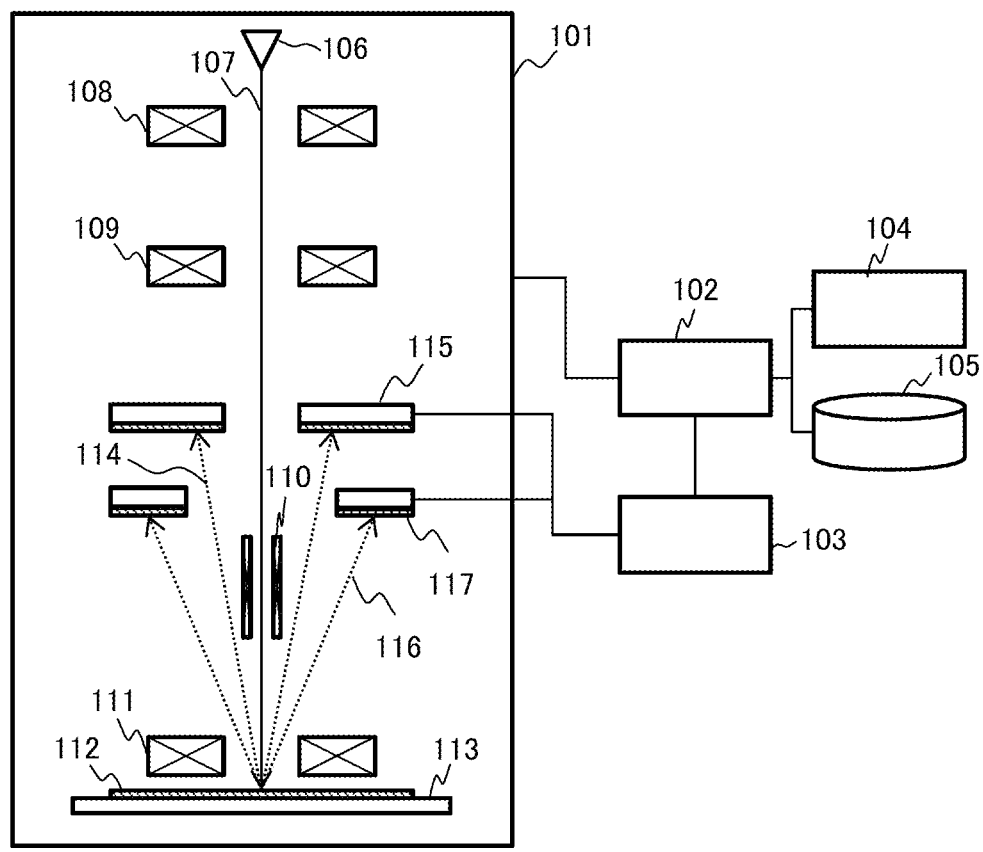

[FIG. 2]
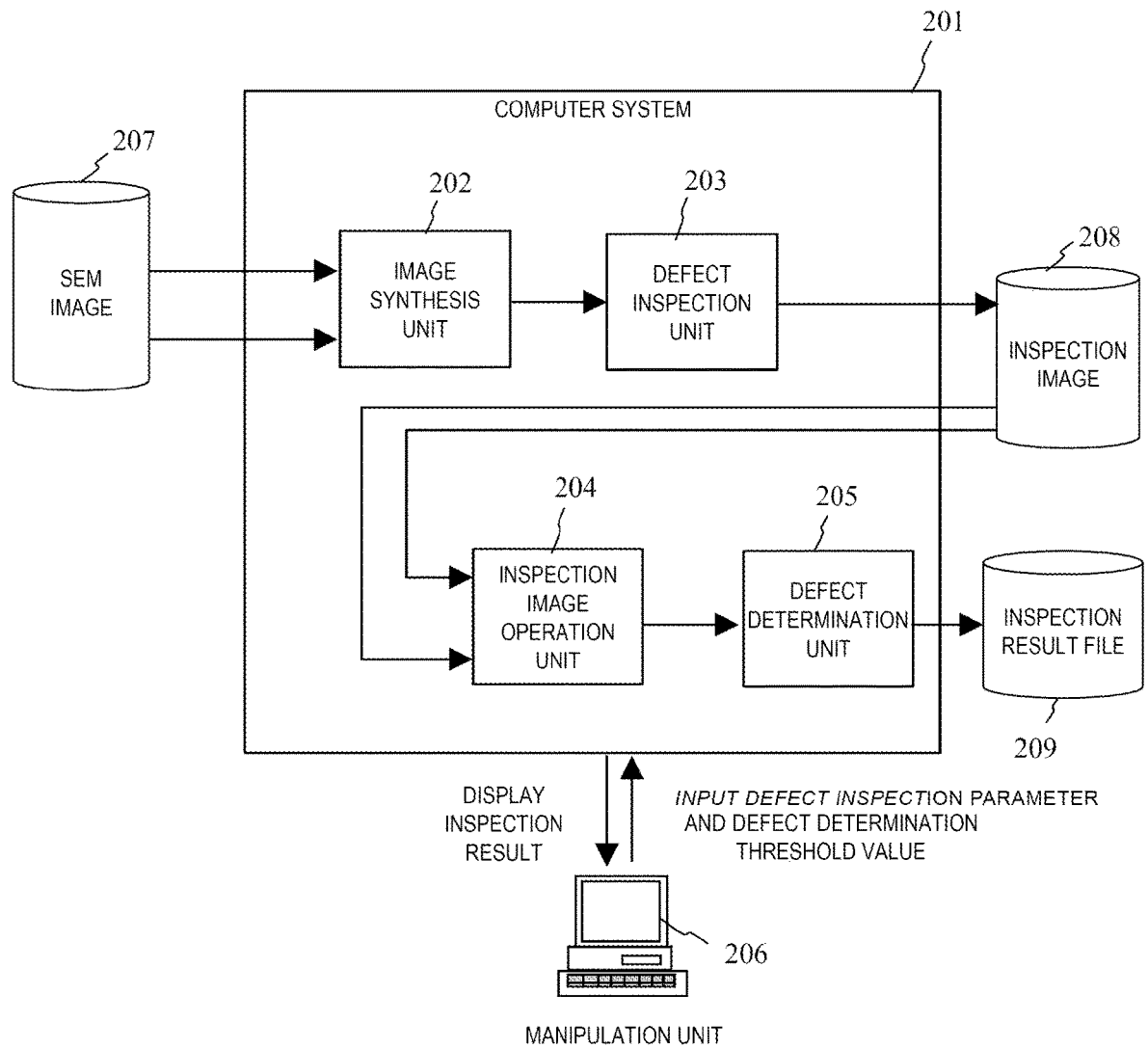

[FIG. 3]
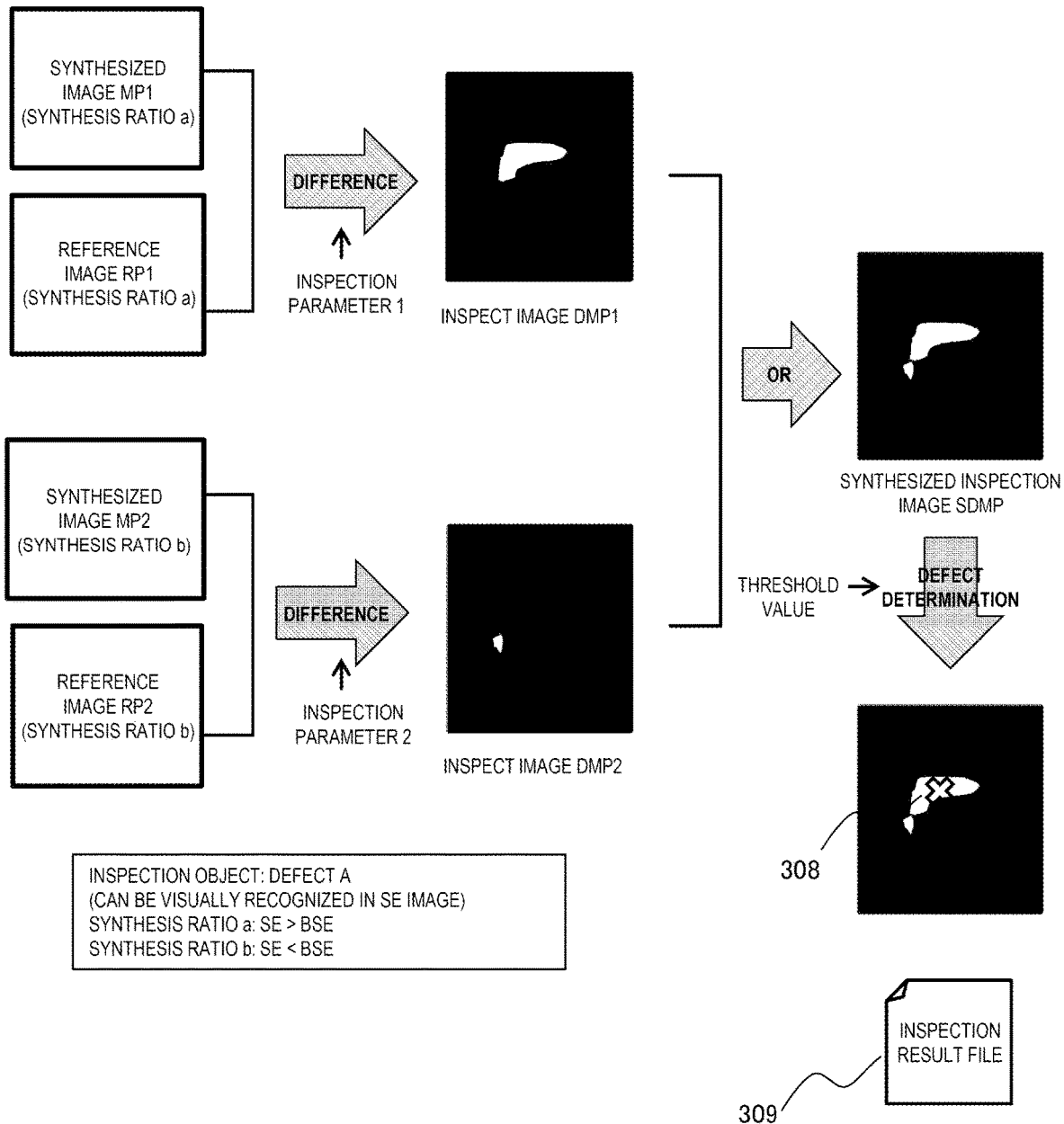

[FIG. 4]
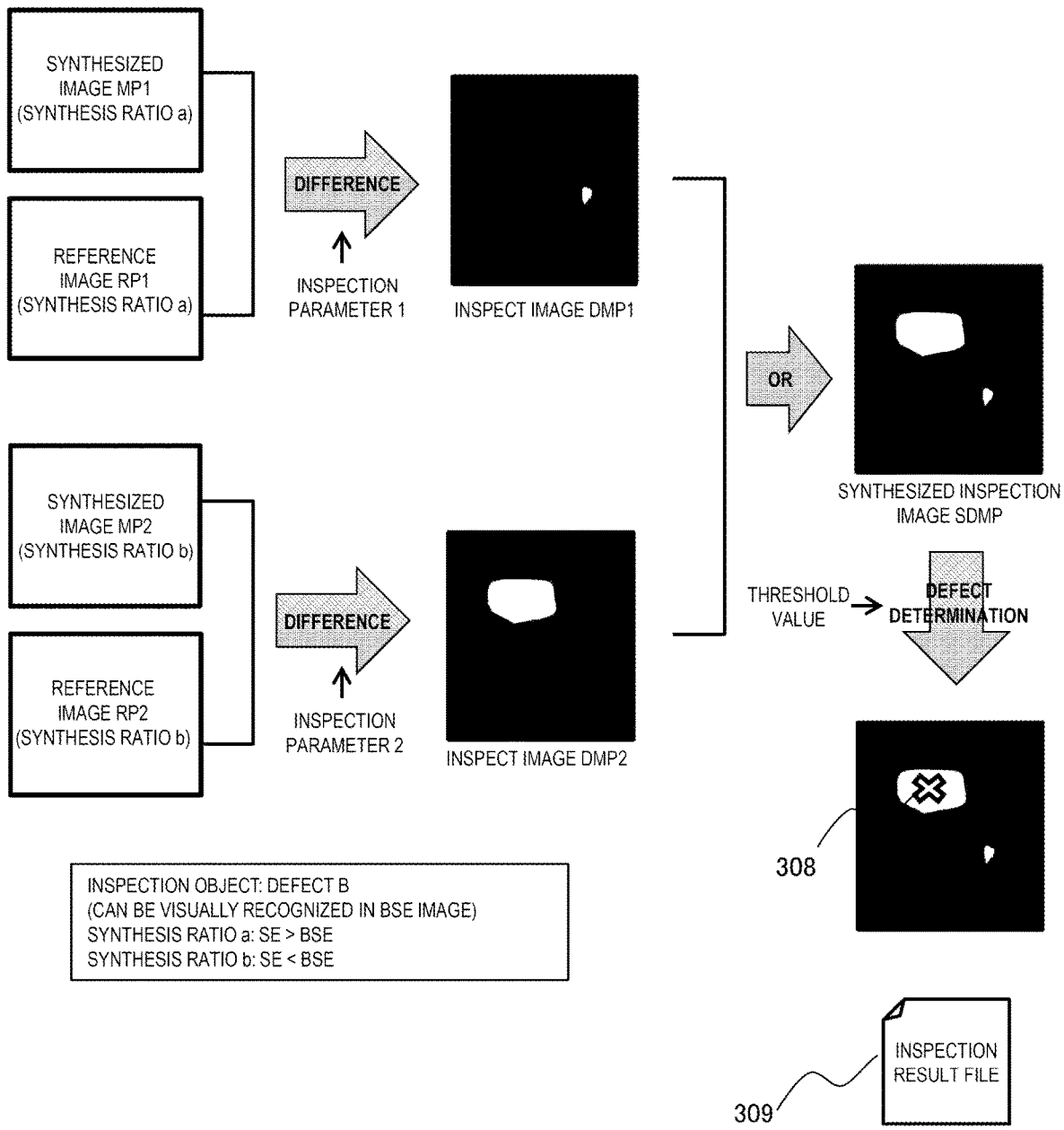

[FIG. 5]
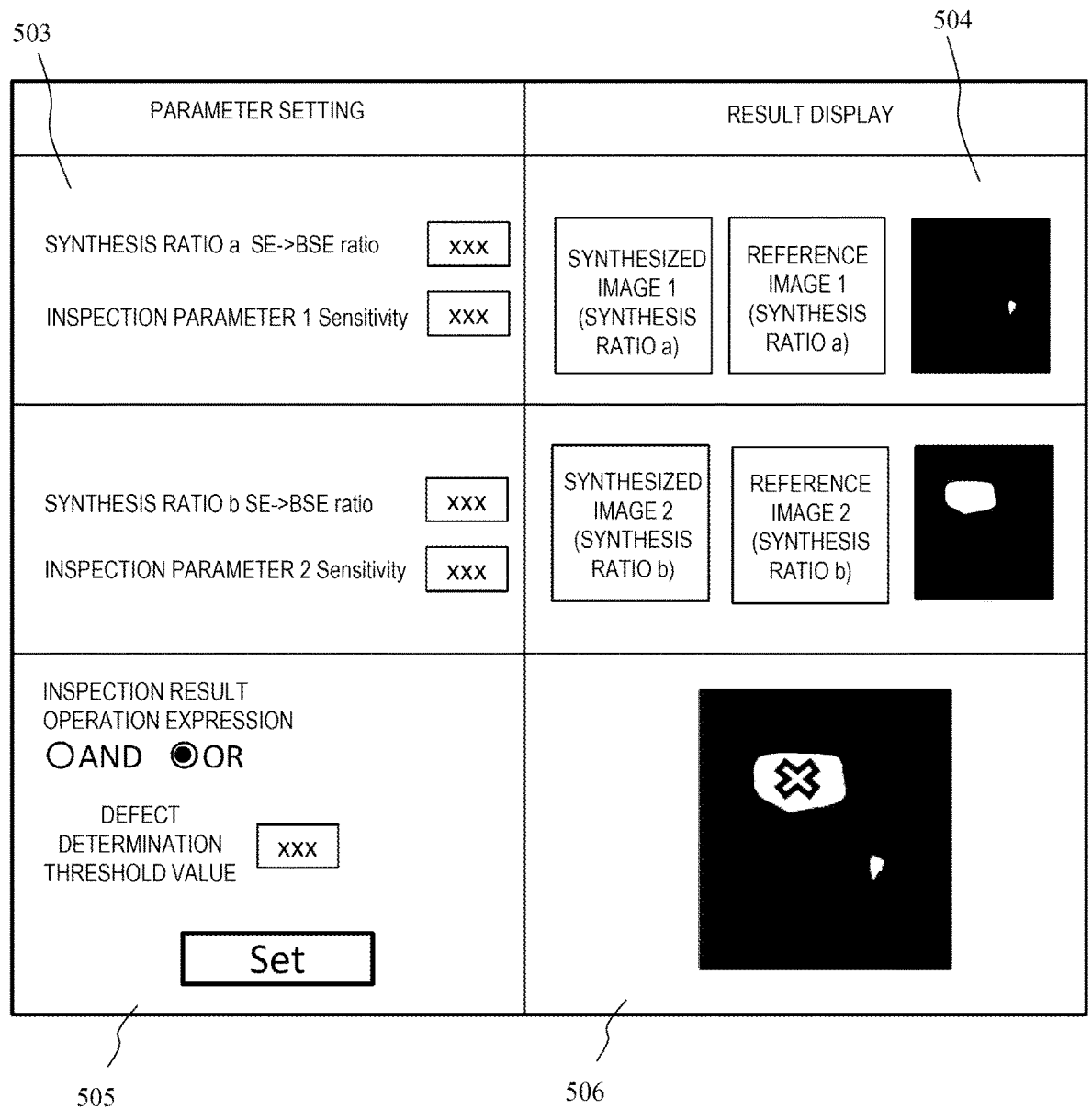

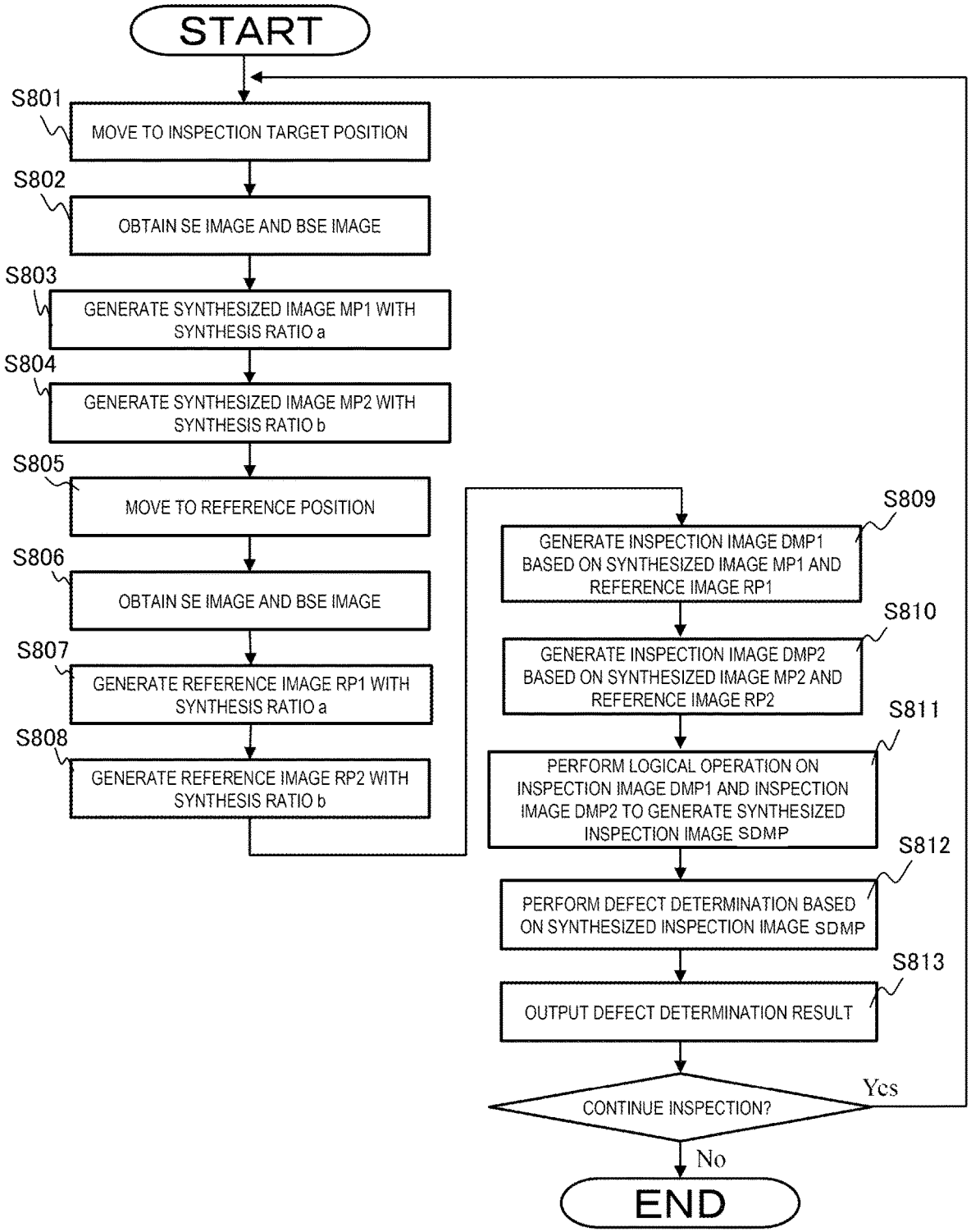
[FIG. 6]

[FIG. 7]
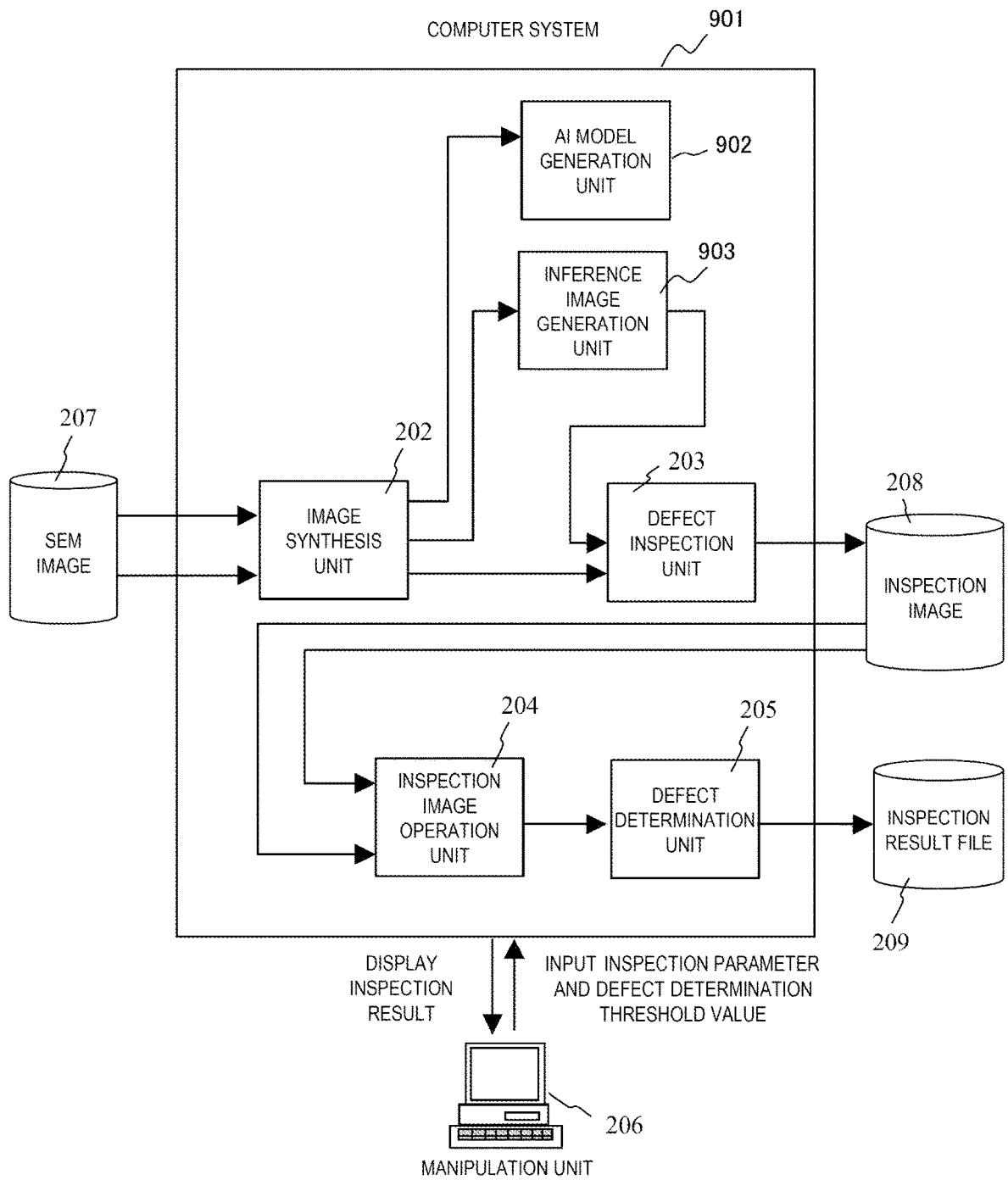

[FIG. 8]
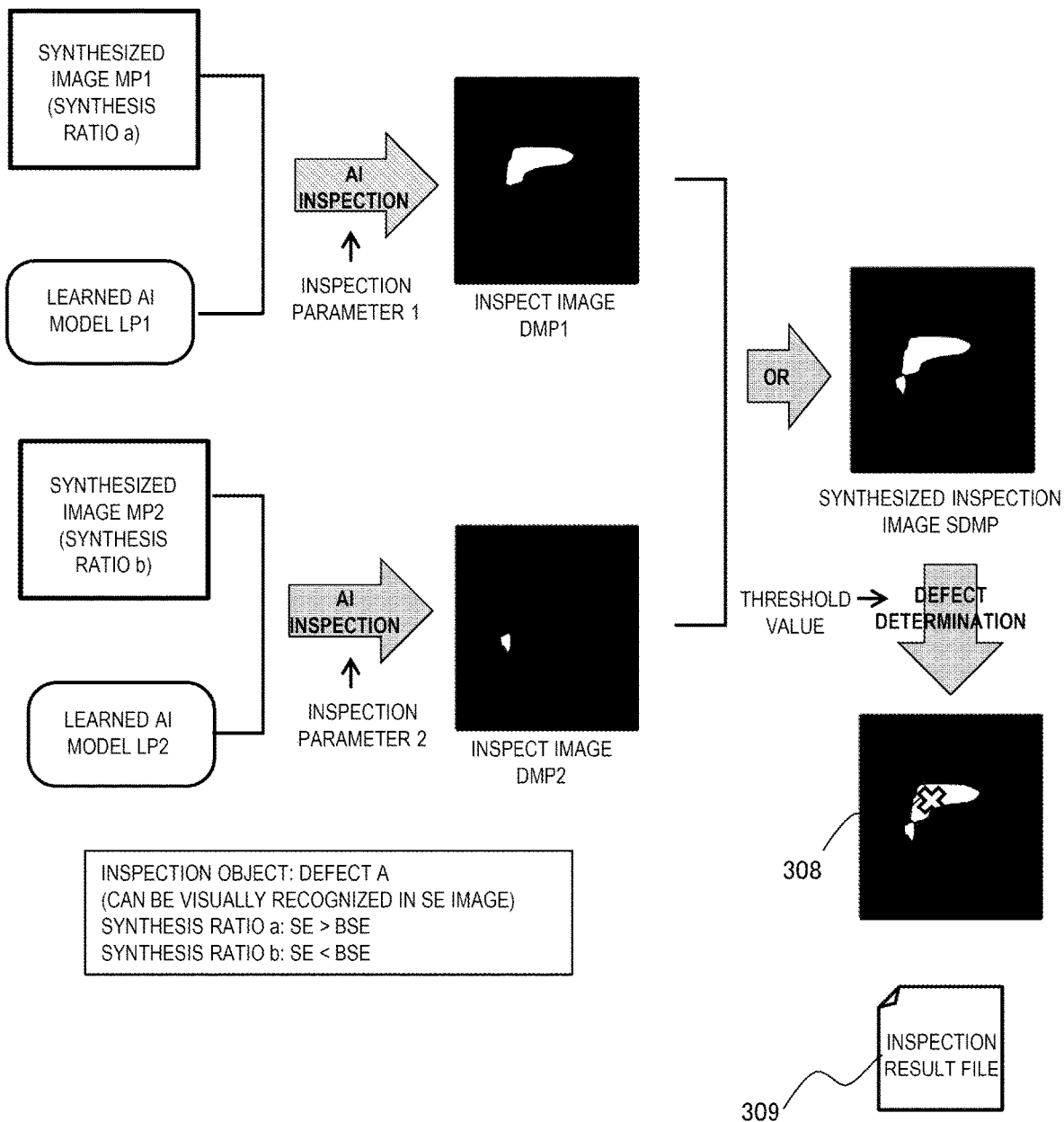

[FIG. 9]
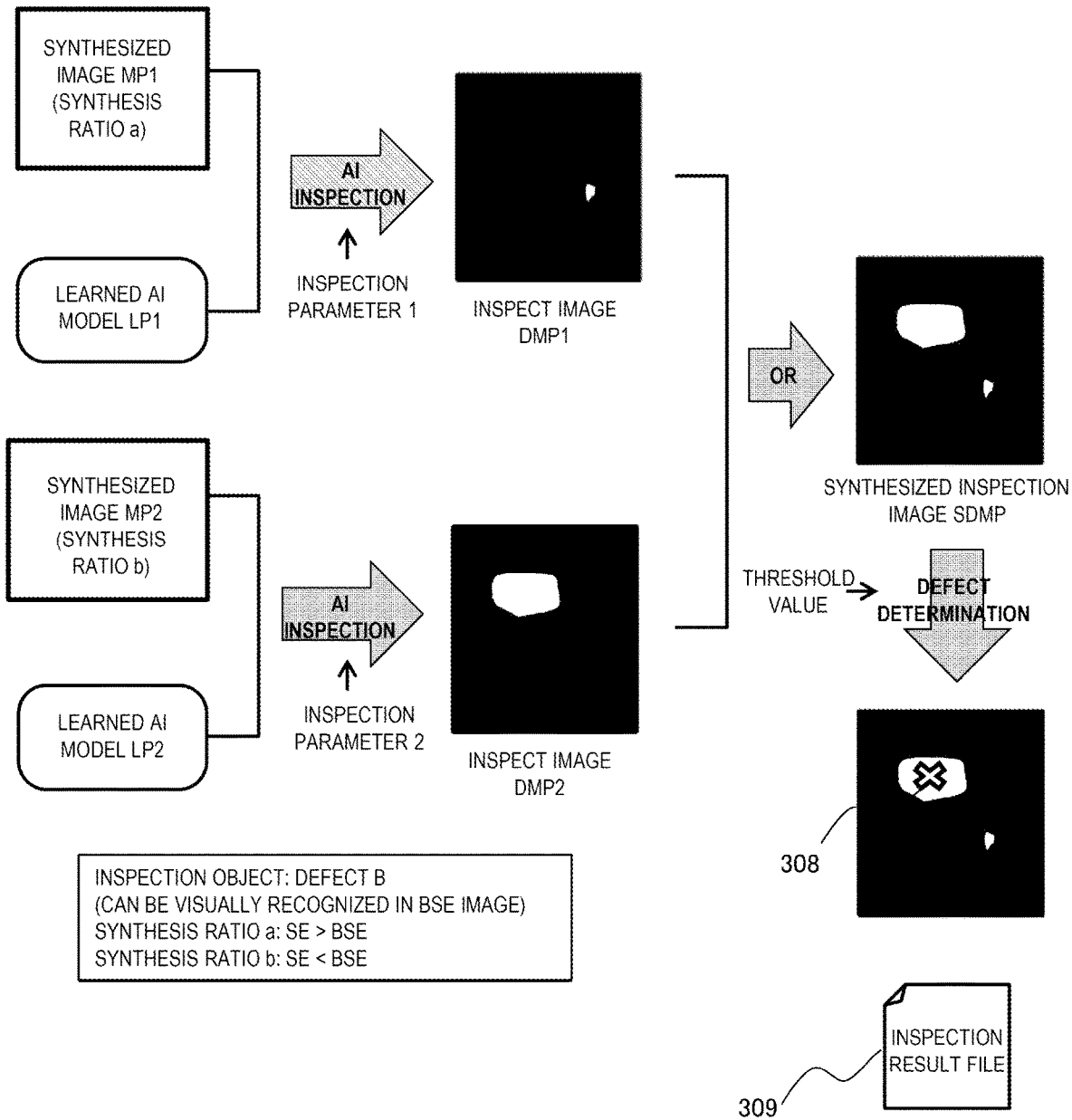

[FIG. 10]
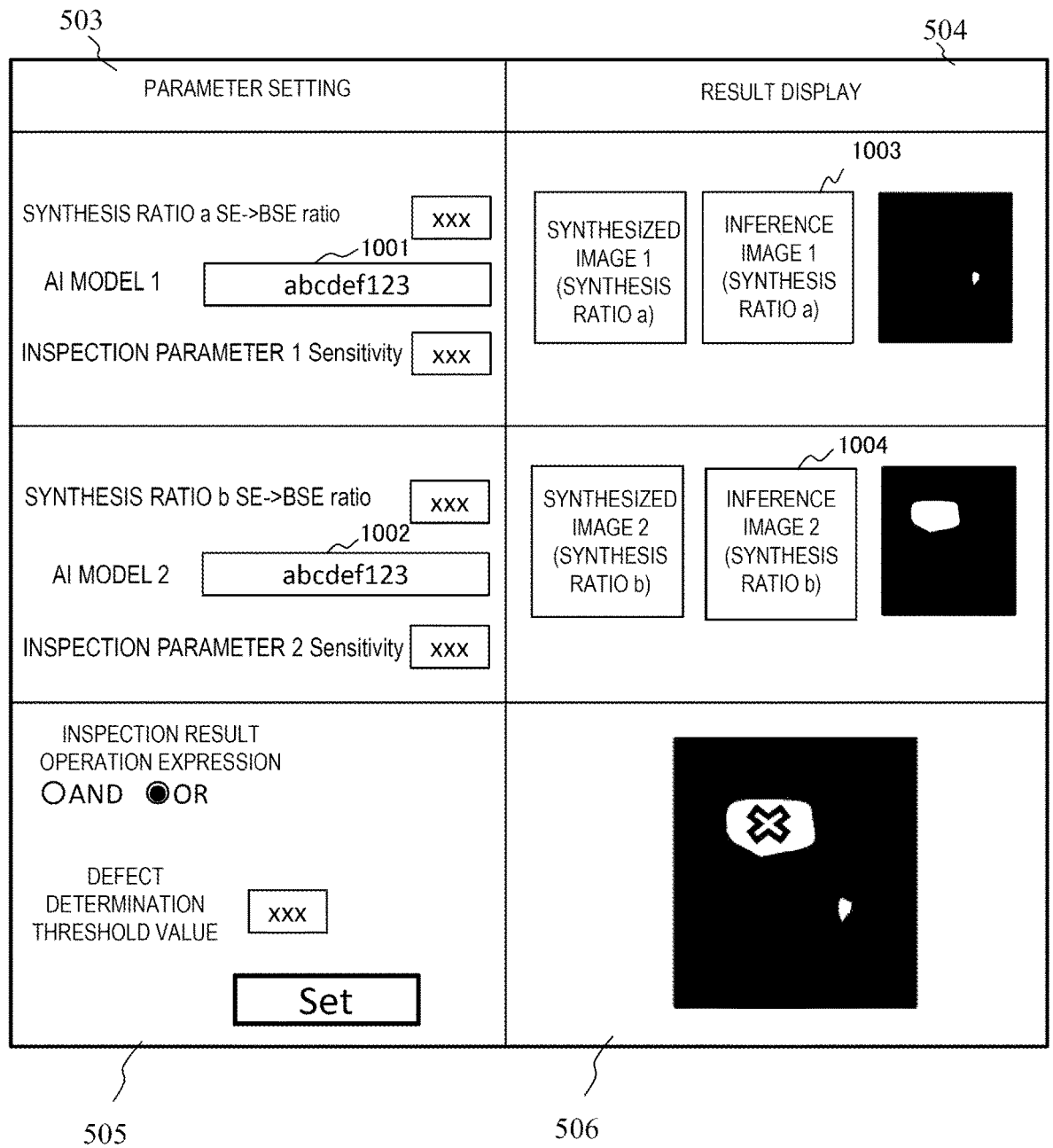

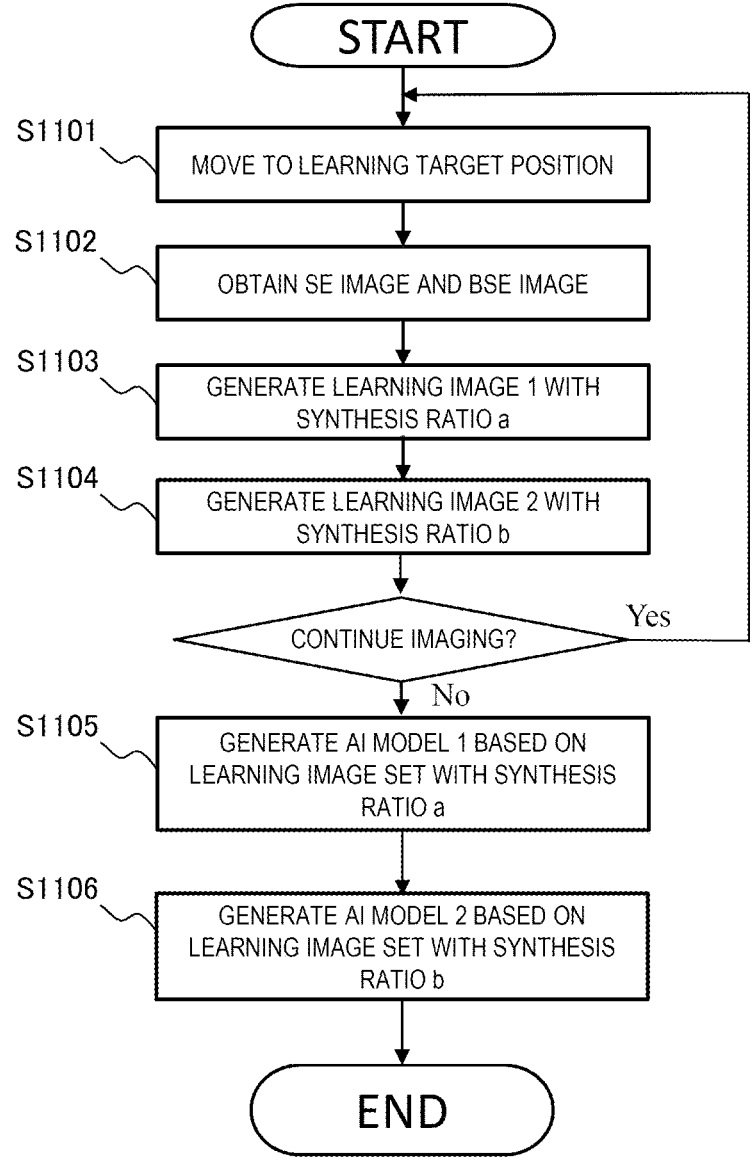
[FIG. 11]

[FIG. 12]
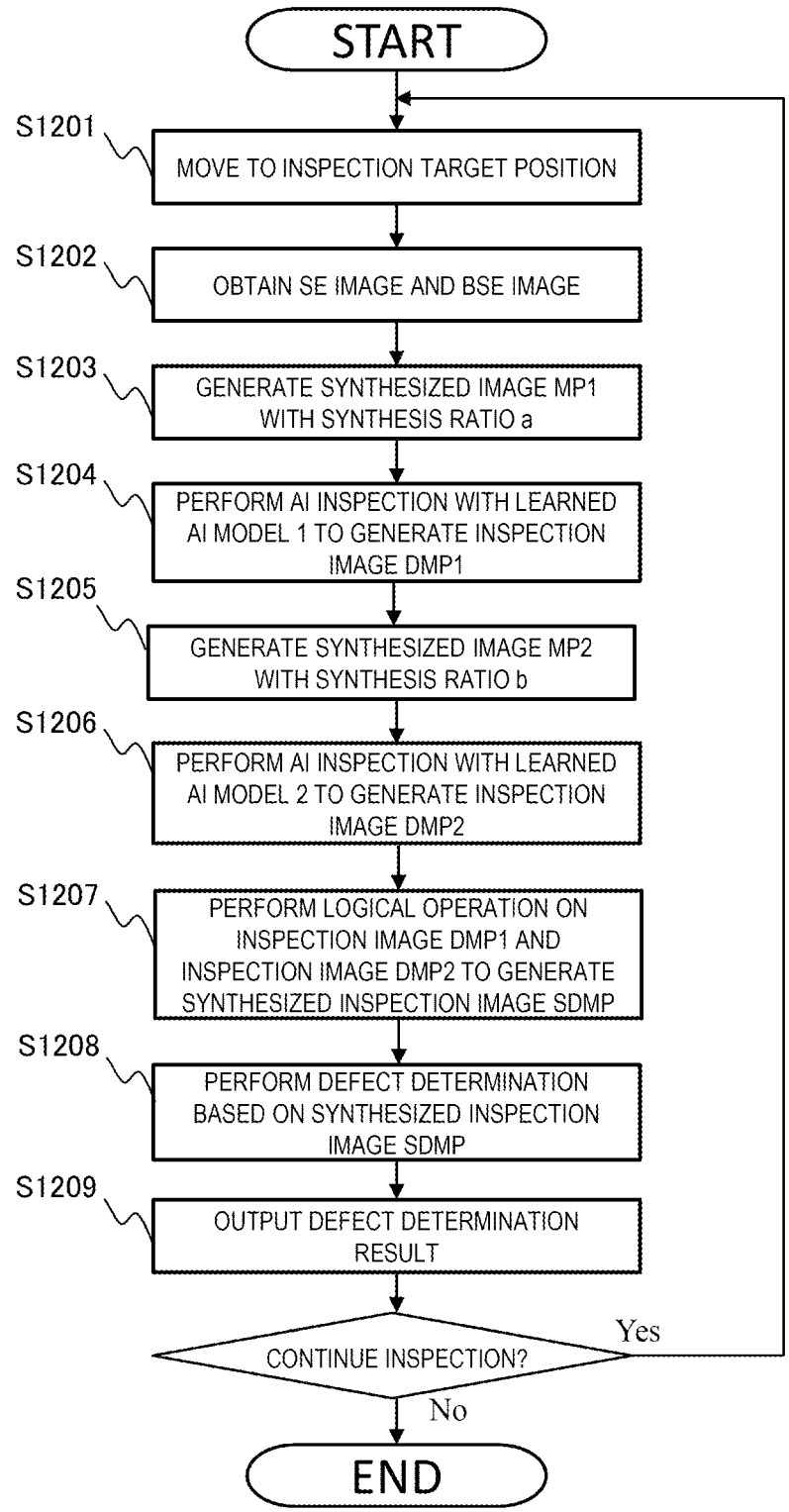

DEFECT INSPECTION WITH IMAGES OF DIFFERENT SYNTHESIS RATIOS

TECHNICAL FIELD

The present invention relates to a defect inspection apparatus and a defect inspection method using the same.

BACKGROUND ART

As a method for detecting a defect on a circuit pattern of a semiconductor, there has been a method of comparing a shape of a normal circuit pattern in which no defect occurs with a measured shape of a circuit pattern to be inspected. In general, defect detection performed using a scanning electron microscope is performed using a secondary electron image (SE image), but as described in PTL 1, there has also been a method of setting an inspection region with respect to a synthesized image obtained by synthesizing a secondary electron image (SE image) and a backscattered electron (BSE) image when it is desired to detect scum more accurately.

There are various types of defects on the circuit pattern of the semiconductor, and depending on the type of defect, some can only be visually recognized by the SE image, and conversely, some can only be visually recognized by the BSE image. For example, a defect caused by electrical characteristics of a semiconductor device such as a voltage contrast can only be visually recognized by the SE image, while a defect such as a circuit pattern being deformed irregularly can only be visually recognized by the BSE image. In such a case, it is known to perform inspection using an image (synthesized image) obtained by synthesizing the SE image and the BSE image.

Such defect inspection performed using a synthesized image, however, can cover various defects but has a trade-off problem that defect detection sensitivity of the defect inspection performed using the synthesized image is lower than that of defect inspection performed using the images before the synthesis. That is, the defects that can only be visually recognized by the SE image probably cannot be detected due to a decrease in sensitivity or the like in the synthesized image obtained by mixing the SE image and the BSE image. Similarly, the defects that can only be visually recognized by the BSE image probably cannot be detected by the synthesized image. In recent years, defects to be detected have a reduced size due to miniaturization of semiconductor patterns. Therefore, cases in which not all types of defects can be inspected by a synthesized image have increased in semiconductor devices of the latest generation.

CITATION LIST

Patent Literature

PTL 1: JP-A-2014-77798
PTL 2: Japanese Patent No. 6281019

SUMMARY OF INVENTION

Technical Problem

The invention provides a defect inspection apparatus and a defect inspection method that can inspect various types of defects in a synthesized image.

Solution to Problem

In view of the above problem, the defect inspection apparatus according to the invention includes: an image synthesis unit configured to synthesize a first detection signal from a first detector and a second detection signal from a second detector with a first synthesis ratio to generate a first synthesized image, and synthesize the first detection signal and the second detection signal with a second synthesis ratio different from the first synthesis ratio to generate a second synthesized image; a defect inspection unit configured to generate a first inspection image based on the first synthesized image and generate a second inspection image based on the second synthesized image; an inspection image operation unit configured to execute a logical operation on the first inspection image and the second inspection image to generate a synthesized inspection image; and defect determination unit configured to execute defect determination on the synthesized inspection image.

Advantageous Effect

According to the defect inspection apparatus and method of the invention, a defect inspection apparatus and a defect inspection method that can inspect various types of defects in a synthesized image can be provided.

BRIEF DESCRIPTION OF DRAWINGS

FIG. 1 is a configuration example of a scanning electron microscope which is an example of an image generation tool for acquiring an image to be inspected in a defect inspection apparatus according to a first embodiment.

FIG. 2 is a block diagram showing an example of a defect inspection system (defect inspection apparatus) that performs image synthesis and defect detection on image data obtained by the scanning electron microscope (image generation tool) as exemplified in FIG. 1 and outputs a result of defect determination.

FIG. 3 is a schematic diagram showing an operation of the defect determination in a computer system 201 according to the first embodiment.

FIG. 4 is a schematic diagram showing an operation of the defect determination in a computer system 201 according to the first embodiment.

FIG. 5 is an example of a GUI screen presented on, for example, a display of a manipulation unit 206 in the defect inspection apparatus according to the first embodiment.

FIG. 6 is a flowchart showing a procedure of defect inspection performed using the defect inspection apparatus according to the first embodiment.

FIG. 7 is a block diagram showing an example of a defect inspection system (defect inspection apparatus) according to a second embodiment.

FIG. 8 is a schematic diagram showing an operation of defect determination in the computer system 201 according to the second embodiment.

FIG. 9 is a schematic diagram showing an operation of the defect determination in the computer system 201 according to the second embodiment.

FIG. 10 is an example of a GUI screen presented on, for example, the display of the manipulation unit 206 in the defect inspection apparatus according to the second embodiment.

FIG. 11 is a flowchart showing a procedure of defect inspection performed using the defect inspection apparatus according to the second embodiment.

FIG. 12 is a flowchart showing a procedure of the defect inspection performed using the defect inspection apparatus according to the second embodiment.

DESCRIPTION OF EMBODIMENTS

Hereinafter, embodiments will be described with reference to accompanying drawings. In the accompanying drawings, elements with the same functions may be denoted by the same number. The accompanying drawings show the embodiments and implementation examples in accordance with principles of the present disclosure, but are for the understanding of the present disclosure and are not intended to limit interpretation of the present disclosure. Descriptions in this specification are merely exemplary, and are not intended to limit the scope of the claims or application of the present disclosure in any sense.

It is necessary to understand that the present embodiment is described in sufficient detail for those skilled in the art to perform the present disclosure, but other implementations and aspects are also possible, and the configuration and the structure can be changed and various elements can be replaced without departing from the scope and the spirit of the technical idea of the present disclosure. Therefore, the following description cannot be construed as being limited to the present embodiment.

First Embodiment

A defect inspection apparatus and method according to a first embodiment will be described with reference to FIGS. 1 to 6. FIG. 1 is a configuration example of a scanning electron microscope which is an example of an image generation tool for acquiring an image to be inspected in a defect inspection apparatus according to the first embodiment. The image generation tool to which the invention is to be applied is not limited to the scanning electron microscope, and for example, a focused ion beam device that generates an image based on scanning of an ion beam may be used as the image generation tool.

The scanning electron microscope shown in FIG. 1 includes an imaging unit 101, a computer system 102, a signal processing unit 103, an input and output unit 104, and a storage unit 105.

The imaging unit 101 includes an electron gun 106 that emits an electron beam 107, a focusing lens 108 that focuses the electron beam 107, and a focusing lens 109 that further focuses the electron beam 107 passed through the focusing lens 108. The imaging unit 101 further includes a deflector 110 that deflects the electron beam 107, and an objective lens 111 that controls a height at which the electron beam 107 is focused.

The electron beam 107 passed through an optical system of the imaging unit 101 irradiates a sample 112 placed on a sample stage 113. Secondary electrons (SEs) 114 emitted from the sample 112 by the irradiation with the electron beam 107 are mainly detected by a secondary electron detector (upper detector) 115. Backscattered electrons (BSEs) 116 emitted from the sample 112 are mainly detected by a backscattered electron detector (lower detector) 117.

The computer system 102 controls the imaging unit 101. The signal processing unit 103 generates SEM images (SE image and BSE image) based on outputs of the upper detector 115 and the lower detector 117. The signal processing unit 103 generates image data by storing a detection signal in a frame memory or the like in synchronization with scanning by a scanning deflector (not shown). When the detection signal is to be stored in the frame memory, a signal profile (one-dimensional information) and the SEM images (two-dimensional information) are generated by storing the detection signal at a position corresponding to a scanning position of the frame memory. The storage unit 105 also functions as a non-transitory recording medium that stores a computer program for controlling an operation of the present system. The input and output unit 104 receives input various instructions from an operator and outputs an inspection result or the like to a display or the like (not shown).

FIG. 2 shows an example of a defect inspection system (defect inspection apparatus) that performs image synthesis and defect detection on the image data obtained by the scanning electron microscope (image generation tool) as exemplified in FIG. 1 and outputs a result of defect determination. The defect inspection system includes a computer system 201 and a manipulation unit 206.

The computer system 201 includes one or more computer subsystems each including one or more CPUs. The one or more computer subsystems can use one or more processors to implement processing described below by software, or may implement the processing partially or entirely by hardware such as an electronic circuit.

As an example, the computer system 201 includes an image synthesis unit 202, a defect inspection unit 203, an inspection image operation unit 204, and a defect determination unit 205. The image synthesis unit 202, the defect inspection unit 203, the inspection image operation unit 204, and the defect determination unit 205 may be virtually implemented by software or may be implemented by hardware such as an electronic circuit.

The computer system 201 is configured to receive an input of a defect inspection parameter and a defect determination threshold value from the manipulation unit 206. The manipulation unit 206 is configured to display an inspection result processed by the computer system 201 on a display or the like.

The computer system 201 synthesizes SEM images 207 (SE image and BSE image) detected by the plurality of detectors (115 and 117) with a pre-designated synthesis ratio by the image synthesis unit 202. As described below, the image synthesis unit 202 can synthesize the SE image and the BSE image with a plurality of (two in the following example) synthesis ratios to generate a plurality of synthesized images.

The defect inspection unit 203 executes defect inspection on an inspection image synthesized by the image synthesis unit 202, and outputs the inspection image to an inspection image storage unit 208. At this time, the image synthesis unit 202 outputs a plurality of inspection images obtained with a plurality of synthesis ratios. The inspection image operation unit 204 performs operation on the plurality of inspection images, and a synthesized inspection image is output as a result of the operation of the inspection image operation unit 204. The defect determination unit 205 performs defect determination on the synthesized inspection image, and an inspection result of the defect determination unit 205 is displayed on the manipulation unit 206 and is output to an inspection result file 209.

Operations of the defect determination in the computer system 201 according to the first embodiment will be described with reference to FIGS. 3 and 4. As described above, there are various types of defects, including defects that can be visually recognized by the SE image but cannot or are difficult to be visually recognized by the BSE image, and conversely, defects that can be visually recognized by the BSE image but cannot or are difficult to be visually recognized by the SE image. In the defect inspection method using the synthesized image of the SE image and the BSE image, any defect can be inspected based on one synthesized image, but the synthesis of the images may cause a trade-off problem that a defect that can be visually recognized by the SE image alone cannot or is difficult to be visually recognized by the synthesized image. In the first embodiment, by performing processes shown in FIGS. 3 and 4, the trade-off problem is solved. FIG. 3 shows a case where a defect A that can only be visually recognized by the SE image occurs in a region to be inspected. FIG. 4 shows a case where a defect B that can only be visually recognized by the BSE image occurs in the region to be inspected.

As shown in FIGS. 3 and 4, in the first embodiment, an SE image and a BSE image captured in the region to be subjected to the defect inspection are synthesized with two synthesis ratios a and b in the image synthesis unit 202 to generate two synthesized images MP1 and MP2. A reference image RP1 and a reference image RP2 are also generated by synthesizing an SE image and a BSE image captured in a normal region (circuit pattern or the like) where no defect occurs with the same synthesis ratios a and b respectively. As an example, the reference images RP1 and RP2 can be generated (synthesized) based on an SE image and a BSE image in a region where no defect occurs that is close to the region where the SE image and the BSE image are captured for the defect inspection.

The defect inspection unit 203 calculates a difference between the synthesized image MP1 and the reference image RP1 by an inspection parameter 1 optimized for the synthesis ratio a to generate an inspection image DMP1. In addition, the defect inspection unit 203 calculates a difference between the synthesized image MP2 and the reference image RP2 by an inspection parameter 2 optimized for the synthesis ratio b to generate an inspection image DMP2. That is, the inspection image DMP1 is a difference image generated based on the synthesized image MP1 with the synthesis ratio a and the reference image RP1, and the inspection image DMP2 is a difference image generated based on the synthesized image MP2 with the synthesis ratio b and the reference image RP2. The inspection parameter 1 and the inspection parameter 2 define a high-sensitivity degree for detecting the defect. By setting the inspection parameters 1 and 2 such that the sensitivity is increased, a smaller defect can be detected. In that case, however, a random noise component of the image may also be detected at the same time, which increases a risk of erroneously detecting a normal circuit pattern as a defect candidate region. Therefore, it is preferable to optimize the inspection parameters 1 and 2 such that a defect can be detected to such an extent that necessary performance of the circuit pattern is secured and the noise component can be reduced as much as possible.

The inspection image operation unit 204 applies a predetermined logical operation (here, logical sum) to the two inspection images DMP1 and DMP2 to generate a synthesized inspection image SDMP. The defect determination unit 205 performs defect determination by analyzing the synthesized inspection image SDMP according to a predetermined threshold value. The logical operation performed by the inspection image operation unit 204 is a logical sum in the example, but the type of the logical operation is not limited to the logical sum, and can be changed according to the selected synthesis ratios a and b, the inspection parameters 1 and 2, and other factors.

In FIG. 3, differences between the two synthesized images MP1 and MP2 generated by the image synthesis unit 202 and the reference images RP1 and RP2 are respectively calculated in the defect inspection unit 203, and the inspection images DMP1 and DMP2 are output from the defect inspection unit 203 as a result of the difference operation. As shown in FIG. 3, when a predetermined defect exists in the inspection images DMP1 and DMP2, a portion corresponding to the defect may be displayed in a form of, for example, a black background painted with white color.

When the defect A that can only be visually recognized by the SE image exists in regions corresponding to the SE image and the BSE image, for example, the inspection images DMP1 and DMP2 as shown in FIG. 3 are obtained.

For example, in the case of FIG. 3 (the case where the defect A exists), the defect A cannot be detected by only the inspection image DMP2 based on the synthesized image obtained by synthesis with the synthesis ratio b. In addition, in the case of FIG. 4 (the case where the defect B exists), the defect B cannot be detected by only the inspection image DMP1 based on the synthesized image obtained by synthesis with the synthesis ratio a. However, in the present embodiment, since the defect detection is performed based on the synthesized inspection image SDMP obtained by performing a logical operation (for example, an OR operation) on the inspection image DMP1 according to the synthesized image MP1 obtained by synthesis with the synthesis ratio a and the inspection image DMP2 according to the synthesized image MP2 obtained by synthesis with the synthesis ratio b, both the defects A and B can be detected. FIGS. 3 and 4 exemplarily show the cases where the defects A and B occur, and the same discussion holds when the number of types of defects increases. That is, according to the present embodiment, the above trade-off problem can be solved.

The synthesis ratio a of the synthesized image MP1 is preferably set to a value such that the SE image has a larger proportion than that of the BSE image, and the synthesis ratio of the synthesized image MP2 is preferably set to a value such that the BSE image has a larger proportion than that of the SE image conversely. In this way, as compared to a case of using a single synthesized image, more types of defects can be detected.

Even when a defect is detected using single synthesized images, it is considered that both the defect A and the defect B can be detected by setting the synthesis ratio to about 50%. However, since normally hundreds of types of defects can occur on a semiconductor device, it is extremely difficult to set an appropriate synthesis ratio for all of the defects. By applying the present embodiment, even in such a case, the defect candidate region can always be secured in the synthesized inspection image SDMP and both the defects A and B can be inspected at the same time even when a defect candidate region only appears in one of the inspection images DMP1 and DMP2.

FIG. 5 is an example of a GUI screen presented on, for example, a display of the manipulation unit 206 in the defect inspection apparatus according to the first embodiment. The GUI screen enables input (setting) of the synthesis ratios a and b, the inspection parameters 1 and 2, and the type of logical operation in the defect inspection methods shown in FIGS. 3 and 4. In the case where such input information is set, the GUI screen can also display the synthesized images, the reference images, the inspection images DMP1 and DMP2, and the synthesized inspection image SDMP.

The GUI screen includes a parameter setting portion 503, an image display portion 504, a logical operation and threshold value setting portion 505, and an inspection result image display portion 506. The parameter setting portion 503 can receive input of the synthesis ratios a and b and the inspection parameters 1 and 2 described above to, for example, numerical value input boxes. When the numerical values and parameters are input to the parameter setting portion 503, the synthesized images MP1 and MP2, the reference images RP1 and RP2, and the inspection images DMP1 and DMP2 are displayed on the image display portion 504 in accordance with the numerical values and the like. The logical operation and threshold value setting portion 505 enables setting of the logical operation to be used when the inspection images DMP1 and DMP2 are to be synthesized, and setting of the threshold value used for defect determination. The inspection result image display portion 506 displays an inspection result image of a case where the defect inspection is performed according to the synthesized inspection image SDMP obtained in this way.

Next, a procedure of the defect inspection performed using the defect inspection apparatus according to the first embodiment will be described with reference to a flowchart in FIG. 6. First, in step S801, the electron beam 107 is moved to an inspection target position (step S801), an SE image and a BSE image are obtained at the inspection target position (step S802), and the obtained SE image and BSE image are synthesized with a synthesis ratio a to generate a synthesized image MP1 (step S803) and are synthesized with a synthesis ratio b to generate a synthesized image MP2 (step S804).

Then, the electron beam 107 is moved to a reference position close to the inspection target position (step S805), an SE image and a BSE image are obtained at the reference position (step S806), and the obtained SE image and BSE image are synthesized with the synthesis ratio a to generate a reference image RP1 (step S807) and are synthesized with the synthesis ratio b to generate a reference image RP2 (step S808).

Next, in step S809, subtraction is performed between the synthesized image MP1 and the reference image RP1, thereby generating an inspection image DMP1 as a difference image of synthesized image MP1 and the reference image RP1. In step S810, subtraction is performed between the synthesized image MP2 and the reference image RP2, thereby generating an inspection image DMP2 as a difference image of synthesized image MP2 and the reference image RP2. In step S811, a logical operation (logical sum operation) is executed on the inspection images DMP1 and DMP2 to generate a synthesized inspection image SDMP. Defect determination at the inspection target position is executed based on the synthesized inspection image SDMP (step S812), and a result of the defect determination is output to the manipulation unit 206 or the like (step S813). The above operations are continued until inspection for all positions to be inspected is completed.

As described above, according to the defect inspection apparatus and method according to the first embodiment, a plurality of inspection images are generated with a plurality of synthesis ratios, and the defect inspection is performed based on the synthesized inspection image obtained by synthesizing the plurality of inspection images. Therefore, according to the first embodiment, various defects can be inspected in accordance with one synthesized inspection image.

Second Embodiment

Next, a defect inspection apparatus and a defect inspection method according to a second embodiment will be described with reference to FIGS. 7 to 12. A block diagram of FIG. 7 shows an example of a defect inspection system (defect inspection apparatus) according to the second embodiment. FIGS. 8 and 9 are diagrams showing operations of defect determination in the computer system 201 constituting the defect inspection system according to the second embodiment, and correspond to FIGS. 3 and 4. In FIG. 7, the same components as those in FIG. 2 are denoted by the same reference numerals as those in FIG. 2, and repetitive description thereof will be omitted below.

The defect inspection system according to the second embodiment includes an AI model generation unit 902 and an inference image generation unit 903 in addition to the components of the first embodiment. In the defect inspection system according to the second embodiment, instead of generating the above reference images, the AI model generation unit 902 generates a learned artificial intelligence (AI) model for generating an inference image, and generates an inference image according to the learned AI model. First inspection images DMP1 and DMP2 are generated based on the inference image and synthesized images MP1 and MP2. The learned AI model includes, as a data set, SE images and BSE images captured in the past, design data, defect determination result data, and the like. The inference image generation unit 903 estimates a shape of an inspection object having no defect (for example, a normal circuit pattern) according to the learned AI model, and outputs the shape as an inference image.

Operations of the defect determination in the computer system 201 will be described with reference to FIGS. 8 and 9. Similar to FIGS. 3 and 4, FIGS. 8 and 9 respectively show cases where a defect A that can only be visually recognized in the SE image occurs in the region to be inspected. FIG. 4 shows the case where the defect B that can only be visually recognized by the BSE image occurs in the region to be inspected. FIGS. 8 and 9 are different from FIGS. 3 and 4 in that comparison by AI (AI inspection) is performed between the synthesized image MP1 and the inference image generated by the learned AI model LP1 and the inspection image DMP1 is generated according to a result of the comparison, and comparison by AI (AI inspection) is performed between the synthesized image MP2 and the inference image generated by the learned AI model LP2 and the inspection image DMP2 is generated according to a result of the comparison. As the inspection parameter 1, a parameter optimized for the image with the synthesis ratio a and the learned AI model LP1 is used. As the inspection parameter 2, a parameter optimized for the image with the synthesis ratio b and the learned AI model LP2 is used. Similar to the first embodiment, the second embodiment can inspect both a defect that can only be visually recognized by the SE image and a defect that can only be visually recognized by the BSE image in one synthesized inspection image at the same time. Further, without the need of obtaining a reference image, it is possible to perform the inspection at a higher speed than that in the first embodiment.

FIG. 10 is an example of a GUI screen presented on, for example, the display of the manipulation unit 206 in the defect inspection apparatus according to the second embodiment. The second embodiment is the same as the first embodiment (FIG. 5) in that the GUI screen includes the parameter setting portion 503, the image display portion 504, the logical operation setting portion 505, and the inspection result image display portion 504. However, in the GUI screen in FIG. 10, one learned AI model can be selected from a plurality of learned AI models in AI model selection portions 1001 and 1002 of the parameter setting portion 503.

On the image display portion 504, inference images 1003 and 1004 corresponding to the selected learned AI model can be displayed.

FIG. 11 shows a flowchart of generating learned AI models as preliminary preparation for examination using the learned AI models. First, a scanning electron microscope having an optical system as shown in FIG. 1 moves to a normal circuit pattern position (learning target position) serving as a learning target (step S1101), and captures an SE image and a BSE image based on detection signals of the upper detector 115 and the lower detector 117 (steps S1101 and S1102).

Next, the obtained SE image and BSE image of the learning target position are synthesized with the synthesis ratio a to generate a learning image 1. Similarly, the SE image and BSE image of the learning target position are synthesized with the synthesis ratio b to generate a learning image 2 (steps S1103 and S1104). When another imaging position serves as the learning target, the operations of S1101 to S1104 are repeated at the other imaging position. When the imaging at all the learning target positions is completed, the AI model generation unit 902 of the computer system 101 shown in FIG. 9 generates a learned AI model LP1 based on a learning image set with the synthesis ratio a. Similarly, a learned AI model LP2 is generated based on a learning image set with the synthesis ratio b, and the preliminary preparation is completed.

FIG. 12 is an example of a flowchart showing a procedure of defect inspection using the learned AI models LP1 and LP2 prepared according to the procedure in FIG. 11. The scanning electron microscope having the optical system as shown in FIG. 1 moves to an inspection target position, and obtains a BSE image and an SE image based on detection signals of the upper detector 115 and the lower detector 117 (steps S1201 and S1202). Then, the SE image and the BSE image are synthesized with the synthesis ratio a to generate a synthesized image MP1 (step S1203).

Next, in the inference image generation unit 903, AI inspection applied with the learned AI model LP1 (the inference image thereof) is performed on the synthesized image MP1 to generate an inspection image DMP1 (step S1204). By the same process, AI inspection using the learned AI model LP2 (the inference image thereof) is also performed on the synthesized image MP2 with the synthesis ratio b to generate an inspection image DMP2 (steps S1205 and S1206). Then, an OR operation is performed on the inspection images DMP1 and DMP2 to generate a synthesized inspection image SDMP (step S1207). Finally, defect determination of the synthesized inspection image SDMP is performed (step S1208), and a defect determination result thereof is output to a specific inspection result file (step S1209). When a next point is to be inspected, the inspection is continued, and the same processes are performed again from step S1201. When no next points are to be inspected, the process is completed. The computer system 901 performs these processes using parameters and an AI model designated from the GUI screen as shown in FIG. 10, for example.

The invention is not limited to the embodiments described above and includes various modifications. For example, the above embodiments have been described in detail for easy understanding of the invention, and are not necessarily limited to those including all the configurations described above. A part of the configuration of one embodiment can be replaced with the configuration of another embodiment, and the configuration of another embodiment can be added to the configuration of one embodiment. A part of the configuration of each embodiment can be combined with another configuration, omitted, or replaced with another configuration.

The invention claimed is:

1. A defect inspection apparatus, comprising:
an image synthesis unit configured to synthesize a first detection signal from a first detector and a second detection signal from a second detector with a first synthesis ratio to generate a first synthesized image, and synthesize the first detection signal and the second detection signal with a second synthesis ratio different from the first synthesis ratio to generate a second synthesized image;
a defect inspection unit configured to generate a first inspection image based on the first synthesized image and generate a second inspection image based on the second synthesized image;
an inspection image operation unit configured to execute a logical operation on the first inspection image and the second inspection image to generate a synthesized inspection image; and
a defect determination unit configured to execute defect determination on the synthesized inspection image.

2. The defect inspection apparatus according to claim 1, wherein
the defect inspection unit is configured to generate the first inspection image and the second inspection image based on the first synthesized image or the second synthesized image and a reference image generated based on the first detection signal and the second detection signal obtained at a reference position.

3. The defect inspection apparatus according to claim 1, wherein
the defect inspection unit is configured to generate the first inspection image and the second inspection image based on the first synthesized image or the second synthesized image and an inference image obtained by learning the first detection signal and the second detection signal with artificial intelligence.

4. The defect inspection apparatus according to claim 1, further comprising:
an input unit configured to input the first synthesis ratio and the second synthesis ratio; and
a display unit configured to display the first synthesized image and the second synthesized image generated with the first synthesis ratio and the second synthesis ratio input by the input unit.

5. The defect inspection apparatus according to claim 4, wherein
the display unit is configured to display the first synthesized image, the second synthesized image, and a reference image generated based on the first detection signal image and the second detection signal obtained at a reference position or an inference image obtained by learning the first detection signal and the second detection signal with artificial intelligence.

6. The defect inspection apparatus according to claim 4, wherein
the input unit is configured to input a type of the logical operation.

7. A defect inspection method, comprising:
a step of synthesizing a first detection signal from a first detector and a second detection signal from a second detector with a first synthesis ratio to generate a first synthesized image, and synthesizing the first detection signal and the second detection signal with a second synthesis ratio different from the first synthesis ratio to generate a second synthesized image;

a step of generating a first inspection image based on the first synthesized image and generating a second inspection image based on the second synthesized image;

a step of executing a logical operation on the first inspection image and the second inspection image to generate a synthesized inspection image; and a step of executing defect determination on the synthesized inspection image.

8. The defect inspection method according to claim 7, wherein the first inspection image and the second inspection image are generated based on the first synthesized image or the second synthesized image and a reference image generated based on the first detection signal and the second detection signal obtained at a reference position.

9. The defect inspection method according to claim 7, wherein the first inspection image and the second inspection image are generated based on the first synthesized image or the second synthesized image and an inference image obtained by learning the first detection signal and the second detection signal with artificial intelligence.

10. The defect inspection method according to claim 7, further comprising:

a step of inputting the first synthesis ratio and the second synthesis ratio; and a step of displaying the first synthesized image and the second synthesized image generated with the input first synthesis ratio and second synthesis ratio.

* * * * *